(12) United States Patent
Vossiek et al.

(10) Patent No.: US 8,559,554 B2
(45) Date of Patent: Oct. 15, 2013

(54) RADIO TRANSMITTER, RADIO RECEIVER, SYSTEM AND METHOD WITH A RADIO TRANSMITTER AND RADIO RECEIVER

(75) Inventors: Martin Vossiek, Hildesheim (DE); Peter Gulden, München (DE); Sven Röhr, München (DE)

(73) Assignee: Symeo GmbH, Neubiberg (DE)

( * ) Notice: Subject to any disclaimer, the term of this patent is extended or adjusted under 35 U.S.C. 154(b) by 827 days.

(21) Appl. No.: 12/302,558

(22) PCT Filed: May 31, 2007

(86) PCT No.: PCT/DE2007/000982
§ 371 (c)(1),
(2), (4) Date: May 18, 2009

(87) PCT Pub. No.: WO2007/137573
PCT Pub. Date: Dec. 6, 2007

(65) Prior Publication Data
US 2009/0285313 A1 Nov. 19, 2009

(30) Foreign Application Priority Data

May 31, 2006 (DE) .......................... 10 2006 025 437
Aug. 20, 2006 (DE) .......................... 10 2006 038 857

(51) Int. Cl.
*H03K 9/00* (2006.01)

(52) U.S. Cl.
USPC ........... 375/316; 375/259; 375/334; 375/260; 375/219; 375/295; 455/91; 340/572.1

(58) Field of Classification Search
USPC ........... 375/295, 259, 334, 260, 219; 455/91; 340/572.1
See application file for complete search history.

(56) References Cited

U.S. PATENT DOCUMENTS

| | | | |
|---|---|---|---|
| 2,379,395 A | 6/1945 | Ziegler et al. | |
| 5,517,197 A * | 5/1996 | Algeo et al. | ................... 342/70 |
| 5,748,891 A | 5/1998 | Fleming et al. | |
| 6,054,950 A | 4/2000 | Fontana | |
| 6,300,903 B1 | 10/2001 | Richards et al. | |

(Continued)

FOREIGN PATENT DOCUMENTS

| | | |
|---|---|---|
| DE | 199 46 161 A1 | 4/2001 |
| DE | 101 57 931 A1 | 6/2003 |
| WO | WO 03/047137 A2 | 6/2003 |
| WO | WO 2005/098465 A2 | 10/2005 |

OTHER PUBLICATIONS

Yang et al., "Ultra-wideband Communications: An Idea Whose Time Has Come," Signal Processing Magazine, IEEE, vol. 21, issue 6, pp. 26-54 (Nov. 2004).

(Continued)

*Primary Examiner* — Kenneth Lam
(74) *Attorney, Agent, or Firm* — Drinker Biddle & Reath LLP

(57) ABSTRACT

A radio transmitter is provided at least comprising a signal generator for generating a continuous signal and an antenna for outputting a transmission signal, wherein at least one output of the signal generator is connected with at least one input of the antenna. Herein, the signal generator is connected with the antenna via an interrupt unit connected between the two for selectively interrupting and maintaining a signal connection between the signal generator and the antenna.

20 Claims, 6 Drawing Sheets

(56) References Cited

U.S. PATENT DOCUMENTS

| | | | |
|---|---|---|---|
| 6,434,194 B1* | 8/2002 | Eisenberg et al. | 375/238 |
| 6,483,461 B1 | 11/2002 | Matheney et al. | |
| 6,810,087 B2* | 10/2004 | Hoctor et al. | 375/259 |
| 2005/0025218 A1* | 2/2005 | Briles | 375/130 |
| 2005/0170797 A1 | 8/2005 | Seisenberger et al. | |
| 2006/0152369 A1* | 7/2006 | Reunamaki | 340/572.1 |
| 2007/0110125 A1* | 5/2007 | Fujita et al. | 375/130 |
| 2007/0248145 A1* | 10/2007 | Kunysz | 375/130 |

OTHER PUBLICATIONS

Barrett, "History of UltraWideBand (UWB) Radar & Communications: Pioneers and Innovators," Progress in Electromagnetics Symposium 2000 (PIERS2000), Cambridge, Massachusetts, published on internet website: https://www.ntia.doc.gov/osmhome/uwbtestplan/barret_history_(piersw-figs).pdf (Jul. 2000).

* cited by examiner

RADIO TRANSMITTER, RADIO RECEIVER, SYSTEM AND METHOD WITH A RADIO TRANSMITTER AND RADIO RECEIVER

BACKGROUND

The invention relates to a radio transmitter, a radio receiver, combinations thereof, and methods suitable for operating the apparatuses, in particular for synchronizing and/or ranging by means of UWB (Ultra Wide Band) signals.

In modern radio location systems and radio identification systems, ultra-wideband (UWB) signals are increasingly being used. The term UWB is used according to the definition of the US Federal Communications Commission (FCC) in cases where signal bandwidth is either at least 20% of the center frequency of the signal, or it is wider than 500 MHz.

A problem with UWB systems is the generation and detection of the UWB signals. In generating UWB signals, stringent legal requirements must be adhered to, and the signal spectra must be within strictly defined frequency masks. In the publications of the FCC or the European Electronic Communication Committee (ECC), for example, such requirements on the spectral masks are published. In common UWB systems, very short pulses (pulse duration typically in the range of between 100 ps-1 ns) are used as signals, and comparatively low pulse repetition rates (1-100 MHz) are used. The chosen mark-to-space ratios of typically 1:100 are necessary so that the signals generated have the very low average power to comply with legal requirements.

Due to the very short pulse durations and compounded by the long pulse separation it is difficult, however, to synchronize the signals of two UWB radio stations. This synchronization is usually carried out by means of special hardware correlators. These hardware correlators are necessary, because due to the extreme bandwidth of the UWB signals, it has hitherto not been possible to cheaply digitize the signals with an analog-to-digital converter to carry out the correlation, or the synchronization, by means of software on a purely computational basis. One of the drawbacks of signal comparison with hardware correlators is that the correlation for various offset points can only be sequentially determined and therefore on the one hand requires time—i.e., the synchronization can only be carried out in a step-wise or slow manner—and on the other hand also unnecessary amounts of power are consumed since a great number of signals need to be transmitted for the synchronization process to sequentially find the synchronization optimum—i.e., the correlation maximum.

A software correlation would be much more advantageous since only one UWB signal would need to be transmitted and received to compute a complete correlation and to find the correlation maximum. It is not possible, however, to implement this approach in a low-cost manner since, with large signal bandwidths, the necessary hardware preconditions are lacking, or are extremely expensive.

As has already been explained, current UWB systems often work with pulse signals and very simple modulation types, such as pulse position modulation or amplitude modulation. Basic principles are disclosed, for example, in "Terence W. Barrett "History of UltraWideBand (UWB) Radar & Communications: Pioneers and Innovators; http://www.ntia.doc.gov/osmhome/uwbtestplan/barret_history_(piersw-figs).pdf". One of the first publications in which especially UWB location systems were treated, is U.S. Pat. No. 5,748,891. Further descriptions of UWB location systems can be found in U.S. Pat. Nos. 6,054,950; 6,300,903; and 6,483,461.

Simple pulse systems mean that it is exceedingly complicated to selectively shape the spectra of the pulses generated. Usually, and in particular with the planned European Admission Regulations, it is necessary that the pulses have a very clearly defined envelope, such as a Gaussian or $\cos^2$-shaped envelope, so that they remain within the spectral masks required by the regulation authorities and generate an extremely small amount of power in the side bands. Such selective amplitude control within such short pulse times is very difficult to implement technically, however.

For the reasons mentioned, newer UWB systems increasingly use more complex modulation types as an alternative, such as OFDM modulation. Since herein the baseband signals are mostly generated by a D/A converter, it has been necessary to limit the signals to a relatively small bandwidth, or to distribute the signals to various subbands, since D/A converters today do not efficiently allow direct generation of signals, for example, with a bandwidth of several GHz. An approach already discussed is, for example, the socalled UWB-MB-OFDM, disclosed, for example, in "Ultra-wideband communications: an idea whose time has come" Liuqing Yang; Giannakis, G. B., Signal Processing Magazine, IEEE Volume 21, Issue 6, November 2004 Page(s): 26-54". Herein, the available spectrum is subdivided in a plurality of bands, and the information is transmitted within each band by means of OFDM modulation.

From German Patent Document No. DE 101 57 931 C2, a possibility for synchronizing radio stations for FMCW systems is known, wherein continuous waves are transmitted and received. A switch serves as a duplexer i.e. as a switch between transmitting and receiving operation. The duplexer is not for signal generation, however, but only for switching between transmitting and receiving.

U.S. Pat. No. 2,379,395 A also shows a switch which forms a duplexer filter as a duplexer. A method is described for frequency stabilizing in a data/communication system with analog frequency modulation, i.e. classical radio technology. The method is only for frequency stabilization of a pure communication system, wherein no synchronization of clocks of different system components is mentioned.

From International Patent Publication No. WO 2005/098465 A2, a method for synchronizing clock means on the basis of FMCW systems is known, wherein continuous waves are transmitted and received.

From German Patent Document No. DE 199 46 161 A1, a method for ranging is known on the basis of FMCW systems, wherein continuous waves are transmitted and received.

SUMMARY

It is therefore the object of the present invention to provide a simple and cheap possibility for synchronizing UWB radio stations, in particular for UWB radio location systems.

The radio transmitter according to the present invention comprises at least one signal generator for generating a continuous signal and an antenna for outputting a transmission signal, wherein at least one output of the transmission signal generator is connected to at least one input of the antenna. Further, the transmission signal generator is connected to the antenna via an interrupt unit interposed between the two, for selectively interrupting and maintaining a signal connection between the transmission signal generator and the antenna, wherein a duration of a pulse period is smaller (or shorter) than a duration of a frequency modulation of the continuous signal generated by the transmission signal generator.

This radio transmitter converts a continuous signal generated thereby, in particular a frequency-modulated continuous signal, into a pulsed signal. Since the generation of a continuous signal is well known and can be cheaply implemented, the radio transmitter can be realized with little additional overhead. Especially when using frequency-modulated pulse-shaped signals, the methods proven for frequency-modulated continuous signals may be utilized in the knowledge of the teachings according to the present invention and with corresponding inventive adaptations for synchronization and ranging with UWB signals.

The selective interruption and maintenance of the signal connection by the interrupt unit is carried out by way of a switching signal externally applied to the interrupt unit.

The selective interruption and maintenance of the signal connection is carried out by the interrupt unit at least partially in regular intervals.

Herein, it is particularly suitable if the selective interruption and maintenance of the signal connection is carried out by the interrupt unit with a fixed pulse period.

It is also advantageous if the continuous signal generated by the transmission signal generator is at least partially a linearly frequency-modulated signal.

Then it is advantageous, if the duration of the pulse period is smaller than a duration of a frequency modulation of the continuous signal generated by the signal generator, in particular smaller by at least a factor of 10.

It is also advantageous if a duration of a frequency modulation of the continuous signal generated by the signal generator is between 100 μs and 100 ms.

Particularly advantageous is a radio transmitter, wherein the signal generator for generating the continuous signal and the interrupt unit for selectively interrupting and maintaining the signal connection are each driven by clock signals which have a known deterministic relationship with respect to each other.

It is then particularly advantageous if the transmission signal generator and the interrupt unit are connected to a digital electronics for driving, which generates each clock signal on the basis of a common clock basis.

Then, a radio transmitter is particularly advantageous which has a clock generator for outputting a clock signal generated by it to the digital electronics; wherein the digital electronics generates a first derived clock signal for input into the transmission signal generator and a second derived clock signal for input into the interrupt unit; and wherein the transmission signal generator generates the continuous signal on the basis of the first derived clock signal which is input into the interrupt unit; and wherein the interrupt unit selectively interrupts and maintains the signal connection between the transmission signal generator and the antenna on the basis of the second derived clock signal.

In this radio transmitter it is particularly advantageous if the interrupt unit comprises an externally driveable switch, in particular a PIN diode, a mixer, a transistor or a micromechanical component.

The object is also achieved by a radio receiver for receiving frequency-modulated and pulse-shaped radio signals, which is configured in such a way that it extracts at least one pair of associated spectral lines from the received frequency-modulated and pulse-shaped radio signals, particularly spectral lines of equal order and known symmetry position. In particular, according to the present invention, parameters may be calculated from a pair of associated spectral lines, which facilitate the use of well known methods for frequency-modulated continuous signals.

Herein, it is particularly advantageous if the spectral lines of the pair of associated spectral lines have the same order and a known symmetry position.

The radio receiver is advantageously configured to determine a frequency offset and/or a time offset from the pair of associated spectral lines.

The radio receiver is further advantageously configured to synchronize itself on the basis of a calculated frequency offset and/or time offset to a clock of a radio transmitter having transmitted the frequency-modulated and pulse-shaped radio signals.

Advantageously, the spectral lines of the pair of associated spectral lines have the same order and a known symmetry position.

Advantageously, the radio receiver is configured to determine a frequency offset and/or a time offset from the pair of associated spectral lines.

Advantageously, the radio receiver is configured to synchronize itself on the basis of the calculated frequency offset and/or time offset to a clock of a radio transmitter having transmitted the frequency-modulated and pulse-shaped radio signals.

The object is also achieved by a radio transmitting/receiving system of at least one radio transmitter as described above and at least one radio receiver for receiving of signals sent from the transmitter configured in a corresponding manner, in particular as described above.

A system is particularly advantageous, in which the radio transmitter and the radio receiver have the same clock source for providing a common clock basis.

The object is also achieved by an arrangement having at least one radio transmitting/receiving system for synchronizing the radio transmitting/receiving system and/or for ranging a response device.

Advantageously, the response device is configured as a transponder, comprising a second radio transmitting/receiving system as also described below.

Alternatively, the response device can be suitably configured as a backscatter transponder, as also described below.

The invention is also achieved by a radio receiver, in particular for use with a radio transmitting/receiving system, which comprises at least one mixer for mixing a received signal with a mixing signal and thereby forming a measuring signal for the purposes of synchronization or ranging, wherein the mixing signal has a similar or identical modulation to the signal of the transmission signal generator.

Herein, "similar" means, in particular, that the modulation has a time offset $\Delta t$ and/or a frequency offset $\Delta f$ with respect to the signal of the transmission signal generator. A frequency offset in the carrier signal frequency usually, and in particular if all clocks are derived from a common clock, leads to the modulation rate, i.e., the speed with which the modulation is carried out, being different.

Various embodiments of the invention are also achieved by a method for generating and evaluating the measuring signal of the radio receiver, wherein interrupting and maintaining a signal connection between the signal generator and the antenna is carried out in such a way that the signal connection in the measuring signal appears as a time quantization with a real sampler, and wherein interrupting and maintaining the signal connection by means of the interrupt unit is carried out time-wise in such a manner that the sampling theorem is fulfilled for the measuring signal.

This is advantageous in particular, if at least the sampling frequency is twice the bandwidth of the measuring signal and the duration of the maintenance of the signal connection is substantially smaller, such as by a factor of 10 smaller than the reciprocal of the highest frequency occurring in the measuring signal.

This is how the information of the measuring signal time-quantized in such a manner can be completely reconstructed and extracted with the help of filtering or spectral analysis; basically a measuring signal is formed in such a way as if the interrupt unit were not present.

The object is also achieved by a combination of corresponding radio transmitter and radio receiver.

Further, various embodiment of the invention are achieved by a method for synchronizing at least one radio transmitter and at least one radio receiver, wherein at least one of the radio transmitters comprises at least one signal generator for generating a continuous signal and an antenna for outputting a transmission signal, wherein the radio transmitter emits a pulse-shaped radio emitting signal from the continuous signal via the antenna by selectively interrupting and maintaining a signal connection to the antenna, and wherein the radio receiver extracts at least one pair of associated spectral lines from the received pulse-shaped radio signals and determines a frequency offset and/or a time offset therefrom, on the basis of which the radio receiver synchronizes itself to a clock of the radio transmitter.

Various embodiments of the invention are also achieved by a method for ranging and/or locating a transponder, wherein a radio transmitter comprises at least one transmission signal generator for generating a continuous signal and an antenna for outputting a transmission signal, wherein the radio transmitter emits via the antenna a pulse-shaped radio transmission signal from the continuous signal towards the transponder by selectively interrupting and maintaining a signal connection, and wherein the transponder reflects this signal towards a radio receiver in a modulated manner and wherein the radio receiver extracts at least one spectral line from the received pulse-shaped radio signals and determines therefrom a distance and/or a position of the transponder.

DESCRIPTION OF THE DRAWINGS

The invention will be described in the following in more detail in a non-limiting manner and purely schematically with reference to exemplary embodiments. In the drawings.

DETAILED DESCRIPTION OF THE PREFERRED EMBODIMENTS

Figure 1:
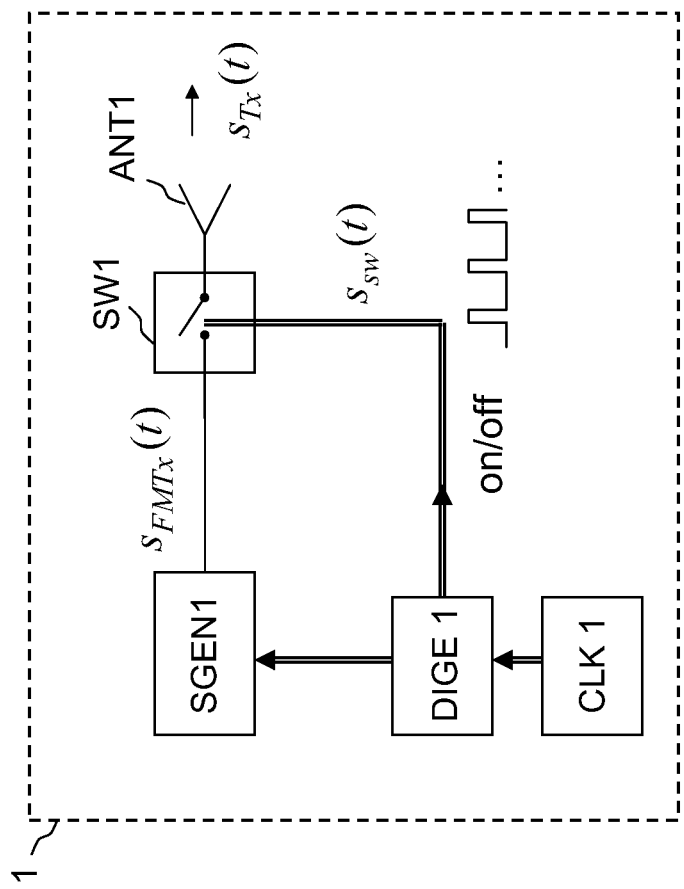
FIG. 1 is a block diagram showing a UWB radio transmitter.

FIG. 1 shows the basic principle of the arrangement for generating the radio transmission signals used (radio transmitter 1). Signal generator SGEN1 of radio transmitter 1 generates a preferably linearly frequency-modulated signal $S_{FMTx}(t)$. This signal is strobed with a switch SW1 by a switching signal $s_{sw}(t)$ so that a pulse-shaped modulated and additionally frequency-modulated UWB transmission signal $S_{Tx}(t)$ is generated. Typically the switch is closed by the switching signal for a duration of about 100 ps to 10 ns, for example, and opened for about 10 to 1000 times as long. A person skilled in the art will recognize that such a switch can be implemented in various ways, such as with PIN diodes, with a mixer, a transistor or a micro-mechanical component, if necessary. The frequency modulation—i.e., for example, the duration of the frequency ramp in linear frequency modulation—should have a duration which is above the pulse period by several orders of magnitude. Suitable values could be, in particular, in the range of 100 microseconds to 100 milliseconds. Preferably a central element of the circuit is a digital electronics DIGE1, which derives all clock signals from a common clock basis, such as a quartz oscillator CLK1, so that all clock periods, or frequencies, of all signals in the circuit are at a known deterministic relationship with respect to one another; if this is not the case, the time offset arising during measuring and synchronization can often not be derived from the frequency offset. A frequency difference of as little as 1 ppm and 30 ms of elapsed time can thus result in an additional time offset of 30 ns. In ranging with radio signals, this time offset corresponds to a ranging measuring error of several meters.

Figure 2:
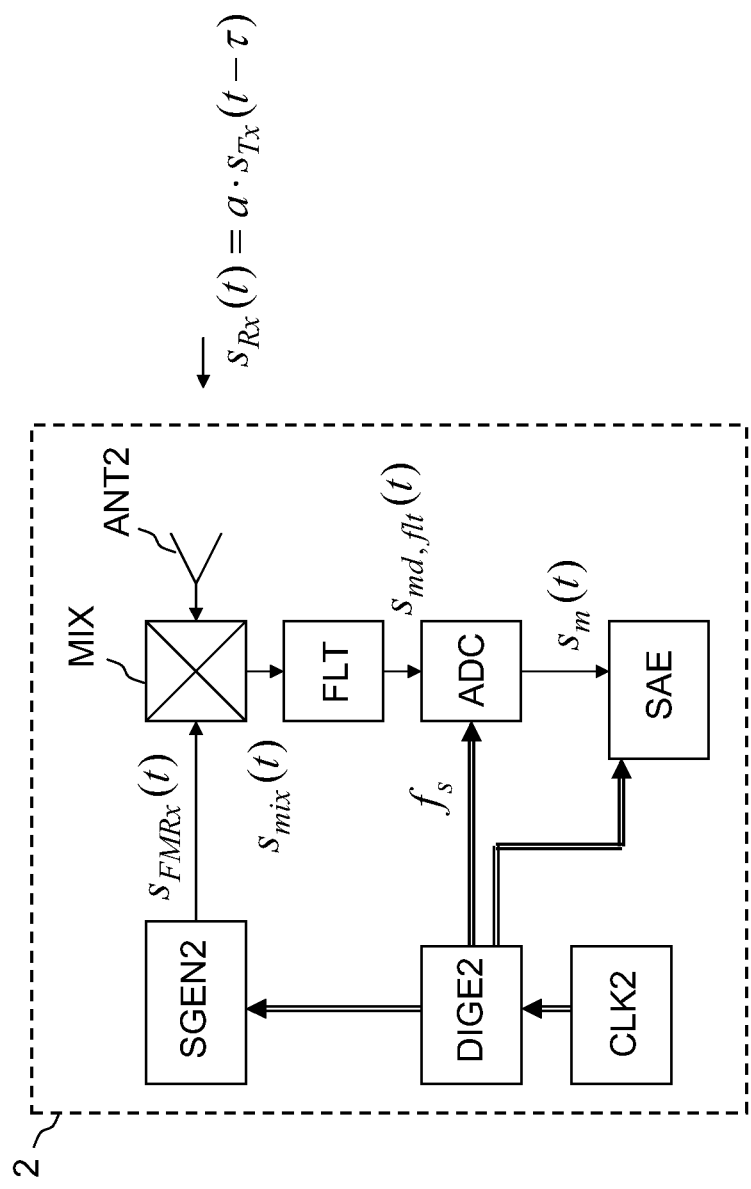
FIG. 2 is a block diagram showing a first embodiment of a UWB radio receiver.

FIG. 2 shows the basic principle of the arrangement for receiving the radio signals generated with the arrangement of FIG. 1 (radio receiver 2). According to embodiments of the present invention, the arrangements from FIGS. 1 and 2 can comprise a first arrangement, with which two radio stations can be synchronized with each other. A second arrangement according to embodiments of the present invention is created if two radio stations each include the two arrangements—i.e. each one from FIG. 1 and FIG. 2—so that radio signals can be transmitted in both directions; this second arrangement is particularly suitable for determining the distance between the two radio stations. In the arrangement of FIG. 2, as in the arrangement of FIG. 1, all clocks or signals are preferably also derived (see above) from a common clock basis (CLK2), DIGE2.

Signal generator SGEN2—in an analogous fashion to the one explained with reference to FIG. 1—generates a frequency-modulated signal $S_{FMRx}(t)$. This signal should preferably be structured according to the same formation law, i.e. should have, if possible, identical modulation to signal $S_{FMTx}(t)$. In a mixer MIX, this signal is mixed with received UWB signal $s_{Rx}(t)$ to obtain signal $S_{mix}(t)$. If, in a simplification, we assume an ideally distortionless channel, received signal $s_{Rx}(t)$ corresponds to transmission signal $s_{Tx}(t)$ wherein it is delayed, however, by the signal delay T and attenuated by the transmission by a factor α.

The mixed signal is fed by the mixer via a filter FLT and an analog-to-digital converter ADC into a signal evaluation unit SAE, wherein the signal is evaluated and further quantities can be calculated. With these quantities, clock and frequency parameters of the signal generator can then be varied.

To increase input power, but in particular to better isolate high-frequency signal components reaching the outside through mixer MIX, an LNA (low noise amplifier) can be used between antenna ANT2 and mixer MIX for amplifying the received signal. As an alternative, a directional coupler can also be used.

For a theoretical discussion of the system it will be assumed that switching signal $s_{sw}(t)$ weights the frequency-modulated signal $S_{FMTx}(t)$ periodically with a pulse-shaped aperture function p(t), i.e.:

$$s_{Tx}(t) = s_{FMTx}(t) \cdot \sum_{n=-\infty}^{\infty} p(t - n \cdot T) \qquad (1)$$

A simple aperture function could therefore be, for example, a rectangle function, i.e. pulses with the width $T_0$ repeating with a period T. In this case it follows:

$$s_{Tx}(t) = s_{FMTx}(t) \cdot \sum_{n=-\infty}^{\infty} rect\left(\frac{t - n \cdot T}{T_0}\right) \qquad (2)$$

Since the mixer works like a multiplier, a signal results behind receiving mixer MIX in the following form:

$$\begin{aligned} s_{mix}(t) &= s_{FMRx}(t) \cdot s_{Rx}(t) \qquad (3) \\ &= s_{FMRx}(t) \cdot s_{Tx}(t - \tau) \\ &= \underbrace{s_{FMRx}(t) \cdot s_{FMTx}(t - \tau)}_{s_{mixc}(t)} \cdot \sum_{n=-\infty}^{\infty} \cdot p(t - \tau - n \cdot T) \end{aligned}$$

In a simplified manner, all amplitude and attenuation factors have been neglected, since they would only scale the result in a linear fashion.

The formula shows that the mixed signal $s_{mix}(t)$ results as a mixed product of two non pulse-modulated signals, i.e., $s_{mixc}(t)$, and this mixed product of the continuous signals is only to be weighted with the pulse sequence. From the sampling theory for a real sampler with a finite aperture time it is known that periodic sampling with an aperture function leads to the following effects:

a) sampling of $s_{mixc}(t)$ with periodic pulse sequence with period T in the spectrum of $s_{mix}(t)$ leads to periodic repetition of the spectrum of $s_{mixc}(t)$ with period 1/T;

b) signal $s_{mixc}(t)$ can be fully reconstructed from the sample signal $s_{mix}(t)$ if the generally known sampling conditions are fulfilled; and c) the periodic multiplication with the aperture function p(t) in the time domain necessitates that the spectrum of $s_{mixc}(t)$ not only has to be periodically repeated, but also has to be weighted with the Fourier transform of the aperture function.

From the above it follows that after treatment of the pulse signals according to the present invention the calculated output parameters can be advantageously and surprisingly used in all methods for synchronizing clocked devices and for ranging or delay measurement between radio stations with FMCW radio signals if certain rules are adhered to in sampling or forming the pulse sequences and the effects of sampling are taken into account in the evaluation of the signals.

As a consequence of the above mentioned relationships between the pulsed and non-pulsed signal, we shall first examine the continuous case in the discussion of the method and the arrangements for synchronizing UWB radio stations. The discussions therefore first result in $s_{mixc}(t)$, for example, wherein transferal to the pulsed case can subsequently be easily carried out, as shown above.

Figure 6:
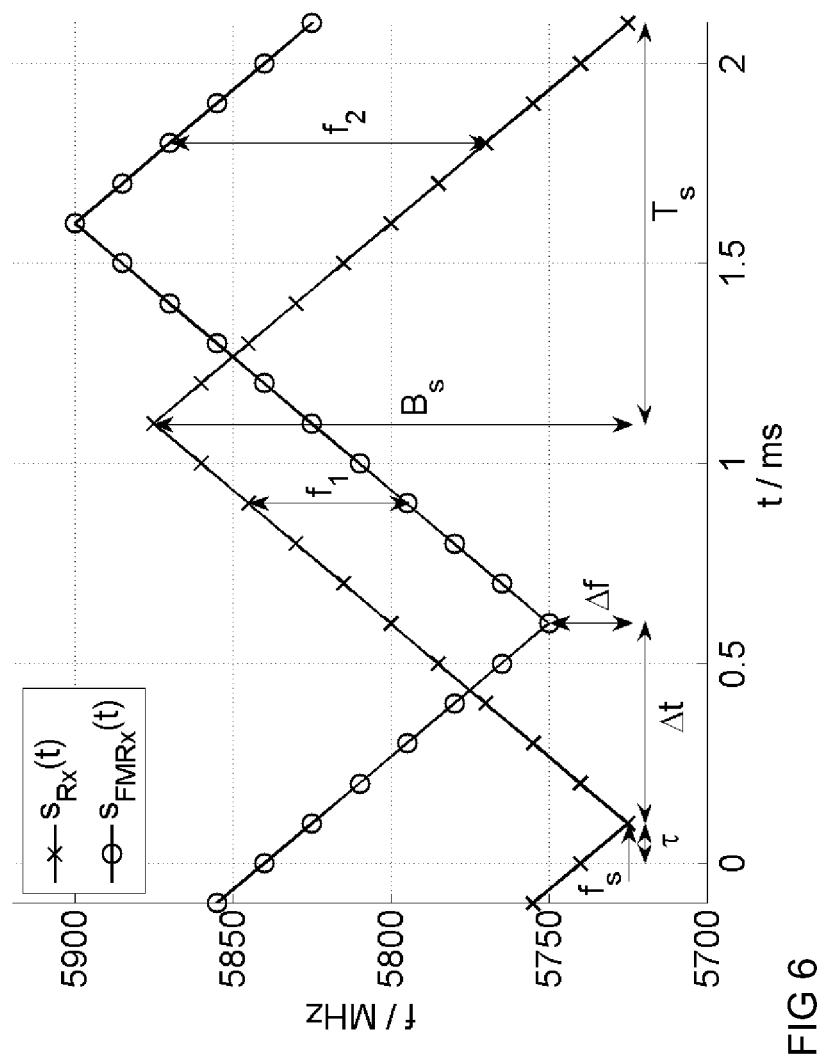
FIG. 6 is a graph of a frequency of a received and a locally generated signal over time.

At the beginning of the measurement (t=0), one of the two radio stations (station 1) involved in the synchronization or ranging process, sends a linearly frequency-modulated signal. This signal reaches the second station after delay T. The frequency behavior of signal $s_{Rx}(t)$ received by station 2, which is characterized by bandwidth Bs, ramp duration Ts and starting frequency fs is shown in FIG. 6.

The signal generator of the second station is used to generate a signal similar to the receiving signal. This locally generated signal $S_{FMRx}(t)$ is distinguished from the received signal by a time offset $\Delta t$, since the two stations were activated at two different points in time, and a frequency offset $\Delta f$ caused by the deviation of the clock sources used for signal generation in the two stations. The frequency behavior of the locally generated signal is also shown in FIG. 6.

To enable the first station to carry out ranging, the second station must first synchronize its locally generated signal with the received signal. After correcting for time and frequency offset, the locally generated signal is finally transmitted back with a known delay time. This is how the first station is able to determine its distance to the second station after the standard FMCW radar principle.

To determine the time and frequency offset between the received and locally generated signals, the two signals are mixed/multiplied with each other and the mixed signal is low-pass filtered. The low-pass filtered mixed signal $S_{md,flt}(t)$ is described by:

$$s_{md,flt}(t) = C_1 \cos\left(2\pi\Delta f(t - \Delta t) + \pi \frac{B_s}{T_s}(-2t\Delta t + \Delta t^2) + C_2\right) \forall t \in (\tau + \Delta t, \tau + T_s) \qquad (4)$$

wherein $C_1$ is a constant determined by the amplitudes of the received and locally generated signals. Constant $C_2$ depends on the starting frequency $f_s$ and the initial phases of the two sinusoid signals.

The frequency of the low-pass filtered mixed signal, $$f_{smd,flt} = \Delta f - \frac{B_s}{T_s} \Delta t \quad \forall t \in (\tau + \Delta t, \tau + T_s) \qquad (5)$$

only depends on time offset $\Delta t$ and frequency offset $\Delta f$. $B_s$ and $T_s$ are constant system parameters. If the frequency of the low-pass filtered mixed signal is determined during a ramp-up ($f_1$) and a ramp-down ($f_2$) by means of the FFT algorithm, a linear equation system is given by:

$$f_1 = \Delta f - \frac{B_S}{T_S} \Delta t \forall t \in (\tau + \Delta t, \tau + T) \qquad (6)$$

$$f_2 = \Delta f + \frac{B_S}{T_S} \Delta t \forall t \in (\tau + \Delta t + T, \tau + 2T) \qquad (7)$$

A solution for time and frequency offset results in $$\Delta f = \frac{f_2 + f_1}{2} \qquad (8)$$

$$\Delta t = \frac{T_S}{B_S} \frac{f_2 - f_1}{2} \qquad (9)$$

After the time and frequency offsets have been calculated according to equations (8) and (9), the locally generated signal can be adapted to the received signal.

A crucial difference in the use of UWB signals generated according to FIG. 1 is that the frequency lines of $f_1$ and $f_2$—also those of $-f_1$ and $-f_2$, if no IQ mixer is used and therefore only measuring signals with real values are present—are now periodically repeated, namely as follows:

$$f_{1n+} = n \cdot \frac{1}{T} + f_1 \text{ and } f_{1n-} = n \cdot \frac{1}{T} - f_1 \quad (10)$$

$$f_{2n+} = n \cdot \frac{1}{T} + f_2 \text{ and } f_{2n-} = n \cdot \frac{1}{T} - f_2$$

Since the sampling pulses should be relatively short pulses and the spectra of the measuring signals of a linear modulation are primarily line spectra, the effects of spectral weighting discussed under b) are usually negligible.

For this reason the effects of periodic repetition of the spectra discussed under a) must be taken into consideration. It is necessary to extract two spectral lines f1$k$ and f2$k$, preferably of the same and known order k and known symmetry position (+ or −) in the measured spectrum in order to derive f1 and f2 therefrom and to substitute them in the above-shown formulae.

For unambiguous detection of the order and symmetry position of the spectral lines, there are various possibilities.
1) Presynchronization with narrow-band FM:
If a bandwidth of $B_s$ <0.5/T is used for synchronization, no mirror frequencies are present in the spectral region to be evaluated due to the periodic continuation because of the UWB sampling (cf. FIG. 5). For the order of the spectral lines, it therefore follows that n=0 and the symmetry position is unambiguous.
2) Additional frequency offset $\Delta f_z$:
One of the two stations is set out of tune by an additional frequency offset $\Delta f_z$ in such a way that frequencies $f_1$ and $f_2$ according to equations (6) and (7)

$$f_1 = \Delta f + \Delta f_z - \frac{B_S}{T_S} \Delta t \quad (11)$$

$$f_2 = \Delta f + \Delta f_z + \frac{B_S}{T_S} \Delta t$$

are always positive. This is how the symmetry position is determined in an unambiguous manner.
3) It is assumed that $\Delta f$ is small: a correction can be achieved with a permutation of plausible frequency pairs.
4) Variation of sweep parameters: if a higher bandwidth Bs <0.5/T is used for synchronization, mirror frequencies in the spectral region to be evaluated will arise due to the periodic continuation of the spectrum because of the UWB sampling. If sweep parameters, such as sweep bandwidth $B_s$ or sweep duration $T_s$ are varied, the position of the mirror frequencies will be displaced. From this displacement, the order and the symmetry position can be derived.
5) Presynchronization can be achieved by means of normal radio communication. For this purpose, for example, the two stations can be sent predetermined binary sequences, the correlation of which can be used to achieve rough synchronization of the clocks.

Example 1

The FMCW-modulated signal is strobed in a rectangular manner. The switching signal used therefore is 9 ns on and 991 ns off. The starting frequency of the sweep is 6.8 GHz, the end frequency is 7.7 GHz and therefore the bandwidth $B_s$=900 MHz. The sweep duration is $T_s$=10 ms and the peak power is −3 dBm.

If presynchronization to an accuracy of 5 μs is achieved by means of normal radio communication, a maximum frequency deviation of about 0.45 MHz results for the spectral lines to be evaluated. Since the period of the spectrum due to the UWB sampling is 1 MHz, direct association of the spectral lines is possible (n=0).

Example 2

The same frequency range as in example 1 is used for the FMCW-modulated signal, the switching times are also identical. The sweep duration is only 2 ms, however. A presynchronization to an accuracy of 100 ms is achieved by means of normal radio communication.

In a first synchronizing step, the sweep bandwidth is narrowed to 10 MHz. This results in a maximum frequency deviation of about 0.5 MHz, so that, again, direct association of the spectral lines is possible. The small bandwidth results in presynchronization to an accuracy of 1 μs, so that, in a second synchronizing step, synchronization can be achieved with the full bandwidth.

Presynchronization can also be achieved by using N sweeps slightly offset in time and by evaluating the amplitude behavior of the measuring signal (or its spectral lines). The larger the amplitude, the better the synchronization, or the smaller the order of the frequency pairs.

Figure 3:
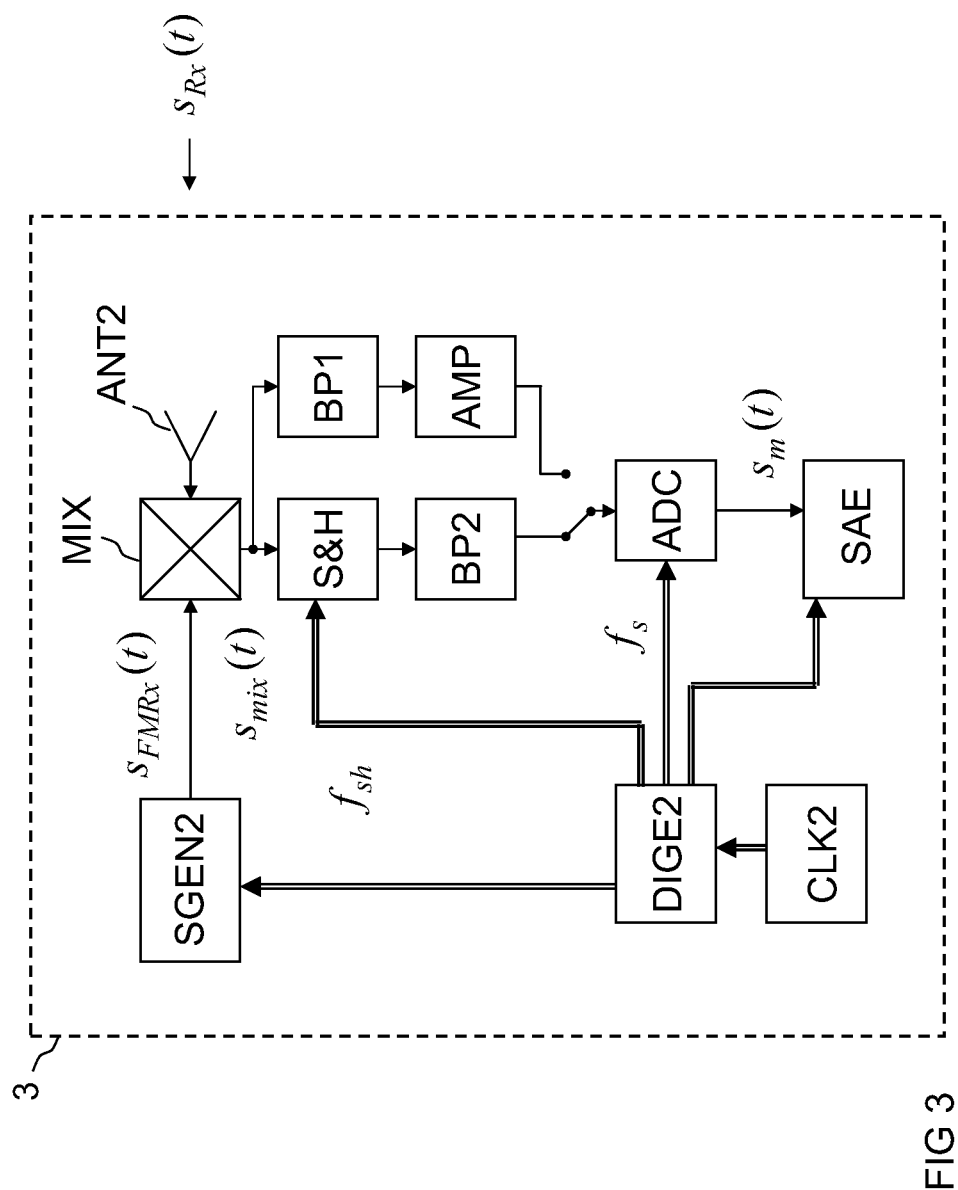
FIG. 3 is a block diagram showing a second embodiment of a UWB radio receiver.

It can be advantageous to switch over to an S&H mode after a first presynchronization, as exemplarily shown in a second embodiment of a radio receiver 3 in FIG. 3. A "sample and hold" (S&H) member is now provided in the receiver 3, which samples the received pulse sequence and holds the value whenever a reflected pulse is actually received. For this purpose it is necessary, however, to synchronize the sampling pulse sequences to the received pulse sequence. Presynchronization can be achieved with the above-mentioned method without S&H, or can be achieved adaptively in the manner of a correlation, by slowly overlapping the two pulse sequences and determining the maximum of the correlation.

The advantage of this variant with synchronous sampling over the variant without S&H is that only substantially weaker amplification is necessary in the receiving branch and a substantially improved signal-to-noise ratio can be expected, since averaging does not have to be carried out over the long periods in which there is no signal but only noise.

Even if there is additional overhead for synchronous sampling due to the required presynchronization, it is still substantially smaller than in normal correlating pulse systems: the pulse duration can be substantially longer and the synchronization does not have to be very precise (basically it is sufficient that the pulse sequences overlap in any substantial manner) since the high-precision correlation is still calculated on the basis of the FM modulation and the large bandwidth is generated with FM modulation and not necessarily with the pulses. For this reason synchronization or hardware correlation is much simpler and quicker than in normal pulse-UWB systems. Also, the measurement can be carried out more quickly and more energy-efficient since a delay range can be covered in each measurement which is 10 to 100 times as wide as in pulse systems.

Generally, presynchronization can be carried out by sampling a first spectral line pair and then synchronizing to a switching clock after the first sampling to improve signal-to-noise ratio.

Figure 4:
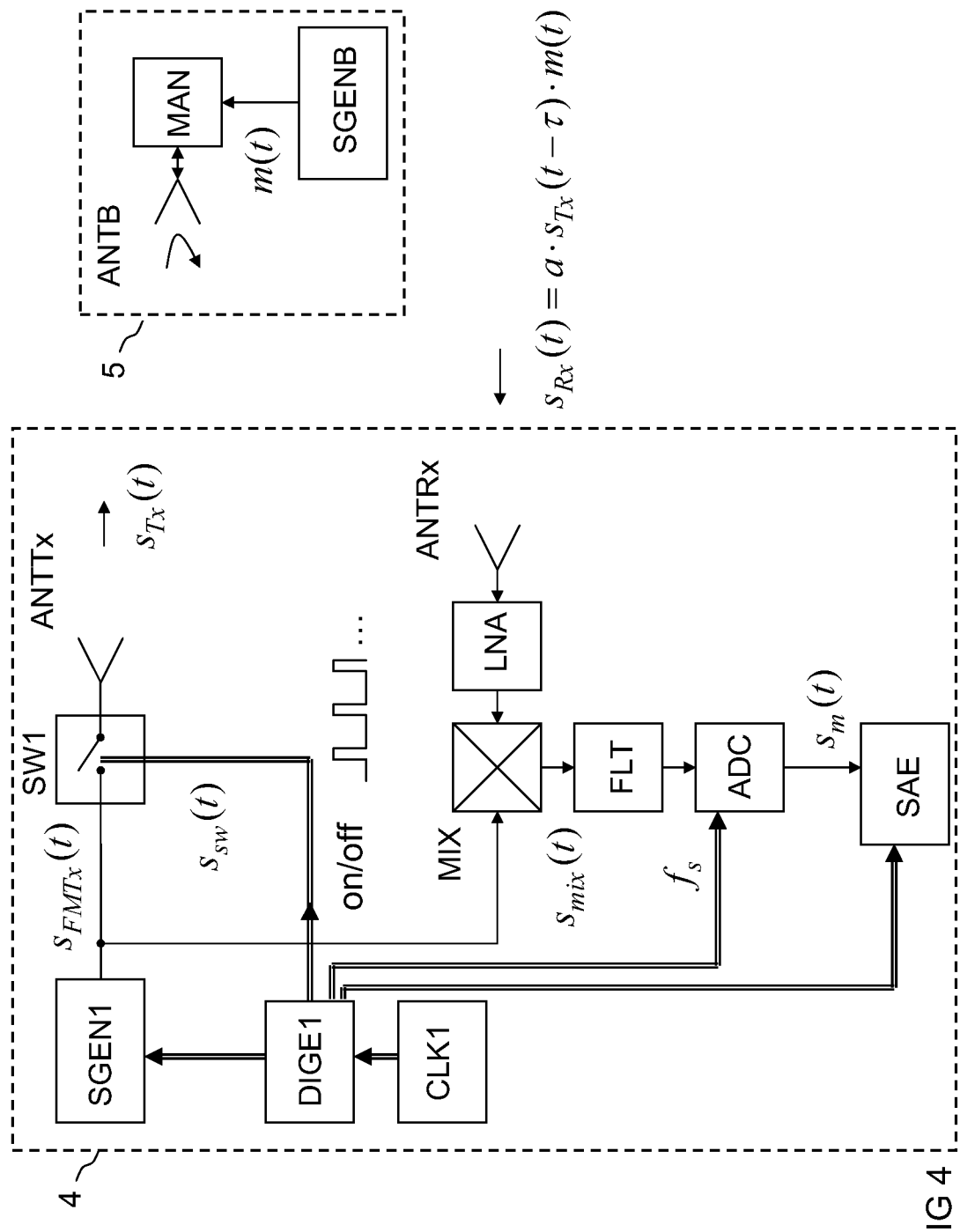
FIG. 4 is a block diagram showing a third embodiment of a UWB radio receiver.

The basic idea of the above-mentioned UWB-FMCW radar can be transferred in an analogous fashion to location systems with a so-called backscatter modulator or transponder, see FIG. 4. For this purpose, the transmitters and receivers are arranged in a common transmitting/receiving unit 4 and the delay of backscattered signals is determined.

To measure the distance to a backscatter modulator or transponder 5, the arrangement of FIG. 1 is extended by elements of FIGS. 2 to 4. As can be seen, the transmitting signal is strobed with a periodic aperture function to thus generate a UWB signal according to the legal regulations. The transmitting signal is reflected in a modulated manner on backscatter modulator 5, wherein the modulation function usually modulates the complex reflection factor behind antenna ANTB with respect to magnitude and/or phase with a modulatable adaptive network MAN. The mixing signal behind receiving mixer MIX results in:

$$s_{mix}(t) = s_{FMRx}(t) \cdot s_{Rx}(t) \quad (12)$$

$$= s_{FMTx}(t) \cdot s_{Tx}(t-\tau) \cdot m(t)$$

$$= \underbrace{s_{FMTx}(t) \cdot s_{FMTx}(t-\tau) \cdot m(t)}_{s_{mixc}(t)} \cdot \sum_{n=-\infty}^{\infty} \cdot p(t-\tau-n\cdot T)$$

From the formula it can be seen that the mixing signal $s_{mix}(t)$ results in a mixing product of two non pulse-modulated signals, i.e. $s_{mixc}(t)$ and this mixed product of the continuous signals is only weighted with the sampling sequence.

Therefore if the modulation frequency of m(t) is chosen to be sufficiently low, or the period T of the sampling is small enough and the aperture time sufficiently short, the information in signal $s_{mix}(t)$ is exactly that information which a continuously transmitting variant (i.e. if SW1 was always on) would deliver.

Preferably the highest frequency of m(t) is to be chosen in such a way that it is smaller than half the sampling frequency, which is smaller than 0.5/T. Preferably, the lowest frequency of m(t) is to be chosen in such a way that it is substantially greater than the reciprocal of the sweep duration. Preferably the duration of the UWB pulses is to be selected in such a way that it is substantially shorter than the reciprocal of the highest frequency occurring in signal m(t).

Suitable parameters for designing a system according to FIG. 4 and for generating the UWB pulses by means of pulse-shaped strobing of the FMCW-modulated signal, would be for example: pulse duration 9 ns; pulse separation 991 ns; lowest frequency of FMCW-sweeps: fMinSweep 6.8 GHz; highest frequency of the FMCW-sweeps: fMaxSweep 7.7 GHz; duration of the FMCW-sweep 100 ms; and highest frequency of m(t) about 400 kHz.

Figure 5:
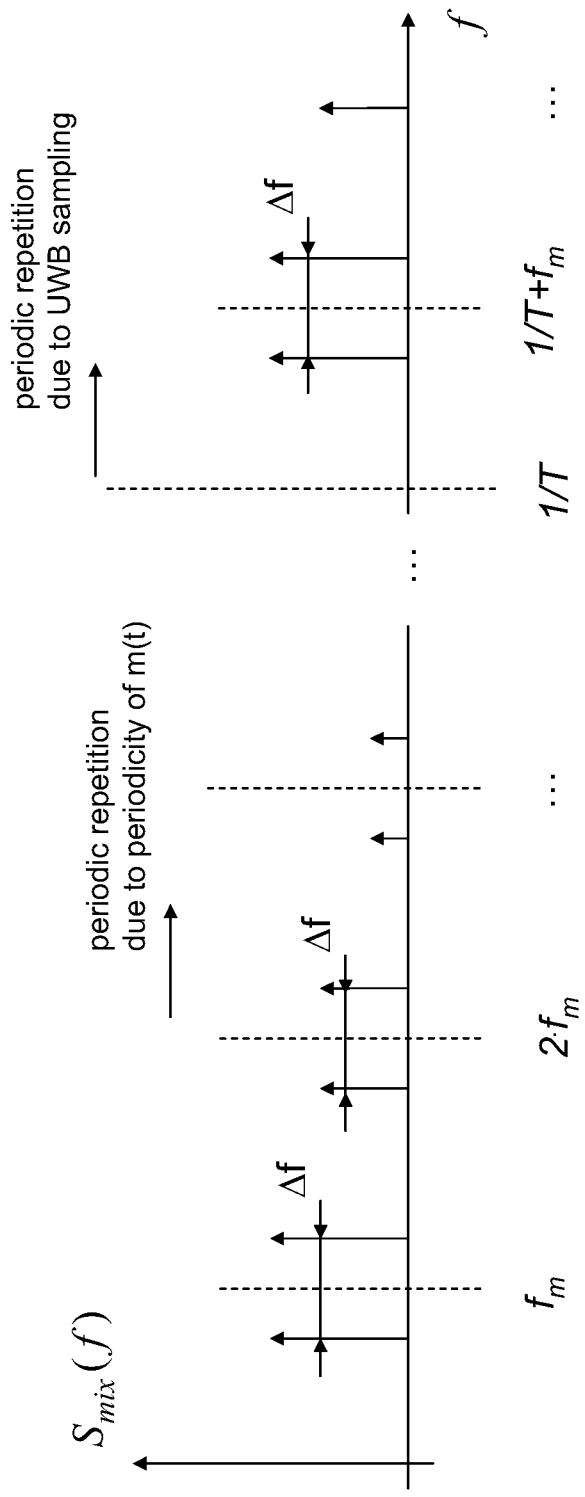
FIG. 5 is a graph of a frequency spectrum with spectral lines.

If m(t) is a periodic band-limited signal having a period duration Tm=1/fm and a bandwidth of <<0.5/T a spectrum $S_{mix}(t)$ of the time signal $s_{mix}(t)$ results in the form as shown in FIG. 5.

Distance Δf of the spectral lines symmetrically arranged around the modulation frequency (the left spectral line is always a mirror image of the negative frequency components on the ordinate) is proportional to the distance. The phase of the two spectral lines symmetrically arranged around the modulation frequency can also be used for ranging and velocity measurement.

The backscattering system implemented here is excellent for use in cheap, low-energy location systems with a short range, such as admission systems (in buildings, vehicles and computers), systems for context-dependent information transfer (in trade fairs, museums, in the production and maintenance of machines, and for supporting the handicapped or the old), RFID systems, logistics but also for high-precision location of tools and robots/robot arms in automation technology or medicine.

The above described exemplary embodiments should not be construed as limiting to the invention or their applications in any way.

The invention claimed is:

1. A radio receiver for receiving a frequency-modulated and pulse-shaped radio signal, comprising:
   at least one mixer; and
   a receiver element that receives a pulse wherein a duration of a pulse period is shorter than a duration of a frequency modulation of the received frequency-modulated and pulse-shaped radio signal;
   wherein:
   the at least one mixer is configured for mixing the received frequency-modulated and pulse-shaped signal with a mixing signal, wherein the mixing signal has only similar or identical frequency-modulation to the signal of said received frequency-modulated and pulse-shaped radio signal; and
   the radio receiver is configured to extract at least one pair of associated spectral lines from the received frequency-modulated and pulse-shaped radio signal, in particular spectral lines of equal order and known symmetry position.

2. The radio receiver according to claim 1, which is configured to:
   determine at least one of a frequency offset and a time offset from a pair of associated spectral lines and to synchronize itself in particular on the basis of at least one of the calculated frequency offset and time offset to a clock of a radio transmitter having sent the frequency-modulated and pulse-shaped radio signals.

3. The receiver according to claim 1, further comprising a radio transmitter and in which said radio transmitter and said radio receiver have a same clock source for providing a common clock basis.

4. The radio receiver according to claim 1, in which a mixed signal is fed by the mixer via a filter, especially via a low pass filter, and an analog-to-digital converter.

5. A radio transmitting/receiving system of at least one radio transmitter and at least one radio receiver or at least one radio transmitter and receiver for receiving a signal emitted by said radio transmitter, in which:
   the at least one radio receiver or the at least one radio transmitter and receiver is configured
   for receiving a frequency-modulated and pulse-shaped radio signal, wherein a duration of a pulse period is shorter than a duration of a frequency modulation of the received frequency-modulated and pulse-shaped radio signal,
   which comprises at least one mixer for mixing the received frequency-modulated and pulse-shaped radio signal with a mixing signal, wherein the mixing signal has similar or identical frequency-modulation to the signal of said received frequency-modulated and pulse-shaped radio signal;
   wherein:
   the receiver is configured to extract at least one pair of associated spectral lines from the received frequency-modulated and pulse-shaped radio signal, in particular spectral lines of equal order and known symmetry position.

6. The system according to claim 5, wherein a response device is configured as a backscatter transponder.

7. The system according to claim 5, wherein the similar modulation has at least one of a time offset and a frequency offset with respect to the signal of said transmission signal generator.

8. The system according to claim 5, in which a mixed signal is fed by the mixer via a filter via a low pass filter and an analog-to-digital converter into a signal evaluation unit.

9. The system according to claim 5, wherein the radio transmitter comprises:
a signal generator for generating a continuous signal;
an antenna for outputting a transmission signal; wherein
at least one output of said transmission signal generator is connected to at least one input of said antenna;
said transmission signal generator is connected to said antenna via an interrupt unit interposed between them for selectively interrupting and maintaining a signal connection between said transmission generator and said antenna;
selective interrupting and maintaining of the signal connection by said interrupt unit is carried out via a switching signal externally applied to said interrupt unit; and
selective interrupting and maintaining of the signal connection is carried out by said interrupt unit in at least partially regular intervals, wherein a duration of a pulse period is shorter than a duration of a frequency modulation of the continuous signal generated by said transmission signal generator.

10. The system according to claim 9, wherein the continuous signal generated in the radio transmitter by said transmission signal generator is an at least partially linearly frequency- modulated signal.

11. The system according to claim 9, wherein in the radio transmitter, said transmission signal generator is driven for generating the continuous signal and said interrupt unit is driven for selectively interrupting and maintaining the signal connection by corresponding clock signals, which are at a known deterministic relationship with respect to one another, wherein said transmission signal generator and said interrupt unit are connected to a digital electronics for driving, which generates each clock signal on the basis of a common clock basis.

12. The system according to claim 9, wherein the radio transmitter comprises:
a clock generator for outputting a clock signal generated by it to the digital electronics;
wherein
said digital electronics generates a first derived clock signal for input into said transmission signal generator and a second derived clock signal for input into said interrupt unit;
said transmission signal generator generates the continuous signal for input into said interrupt unit on the basis of the first derived clock signal; and
said interrupt unit selectively interrupts and maintains the signal connection between said transmission signal generator and said antenna on the basis of the second derived clock signal.

13. The system according to claim 5, in which the receiver is configured to:
determine at least one of a frequency offset and a time offset from a pair of associated spectral lines; and
a) synchronize itself in particular on the basis of at least one of the calculated frequency offset and time offset to a clock of a radio transmitter having sent the frequency-modulated and pulse-shaped radio signal; or
b) extract a range information on the basis of at least one of the calculated frequency offset and time offset.

14. A method for receiving frequency-modulated and pulse-shaped radio signal, wherein a duration of a pulse period is shorter than a duration of a frequency modulation of the received frequency-modulated and pulse-shaped radio signal, comprising:
mixing the received frequency-modulated and pulse-shaped radio signal with a mixing signal, wherein the mixing signal has similar or identical frequency-modulation to the signal of said received frequency-modulated and pulse-shaped radio signal;
filtering, especially low pass filtering of the mixed signal, analog-to-digital converting of the filtered signal and signal evaluation of the converted signal; and extracting of at least one pair of associated spectral lines from the received frequency-modulated and pulse-shaped radio signal, in particular spectral lines of equal order and known symmetry position.

15. The method according to claim 14, comprising:
determining at least one of a frequency offset and a time offset from a pair of associated spectral lines and to synchronize itself in particular on the basis of at least one of the calculated frequency offset and time offset to a clock of a radio transmitter having sent the frequency-modulated and pulse-shaped radio signal.

16. The method according to claim 14 for generating and evaluating a measuring signal in a radio receiver, wherein:
an interrupting and maintaining a signal connection between a signal generator and an antenna is carried out in such a way that the signal connection appears in the measuring signal as a time quantization with a real sampler, and in that interrupting and maintaining the signal connection is carried out by means of said interrupt unit on a time basis in such a way that the sampling theorem is fulfilled for the measuring signal.

17. The method according to claim 16, wherein at least a sampling frequency is twice the bandwidth of the measuring signal and wherein the duration of the maintenance of the signal connection is substantially smaller by a factor of 4 than the reciprocal of the highest frequency occurring in the measuring signal.

18. The method according to claim 14 for synchronizing at least one radio transmitter and at least one radio receiver, wherein at least one of said radio transmitters comprises at least one signal generator for generating a continuous signal and an antenna for emitting a transmission signal, wherein:
said radio transmitter emits via the antenna a pulse-shaped radio transmission signal from the continuous signal by selectively interrupting and maintaining a signal connection to the antenna, wherein a duration of a pulse period is shorter than a duration of a frequency modulation of the continuous signal generated by said transmission signal generator; and
said radio receiver extracts at least one pair of associated spectral lines from the received pulse-shaped radio signal and determines therefrom at least one of a frequency offset and a time offset, on the basis of which said radio receiver synchronizes itself to a clock of said radio transmitter.

19. The method according to claim 18, wherein the transponder is configured as a backscatter transponder.

20. The method according to claim 14 for at least one of ranging and locating a transponder, wherein a radio transmitter comprises at least one signal generator for generating a continuous signal and an antenna for outputting a transmission signal, wherein:

said radio transmitter emits a pulse-shaped radio transmission signal from the continuous signal towards said transponder via said antenna by selectively interrupting and maintaining a signal connection to said antenna, wherein a duration of a pulse period is shorter than a duration of a frequency modulation of the continuous signal generated by said transmission signal generator; and said transponder reflects the signal towards a radio receiver in a modulated fashion and in that said radio receiver extracts at least one spectral line from the received pulse-shaped radio signal and determines at least one of a distance and position of said transponder therefrom, on the basis of which said radio receiver synchronizes itself with a clock of said radio transmitter.

\* \* \* \* \*